United States Patent
Kaempf et al.

(10) Patent No.: US 6,838,543 B2
(45) Date of Patent: Jan. 4, 2005

(54) METHOD FOR PRODUCING POLYCARBONATES

(75) Inventors: Rudolf Kaempf, Haingründau (DE); Fritz Wilhelm, Karben (DE)

(73) Assignee: Zimmer AG, Frankfurt (DE)

( * ) Notice: Subject to any disclaimer, the term of this patent is extended or adjusted under 35 U.S.C. 154(b) by 0 days.

(21) Appl. No.: 10/433,252

(22) PCT Filed: Nov. 8, 2001

(86) PCT No.: PCT/EP01/12930

§ 371 (c)(1),
(2), (4) Date: Dec. 1, 2003

(87) PCT Pub. No.: WO02/44244

PCT Pub. Date: Jun. 6, 2002

(65) Prior Publication Data

US 2004/0106765 A1 Jun. 3, 2004

(30) Foreign Application Priority Data

Dec. 1, 2000 (DE) .......................... 100 59 616

(51) Int. Cl.[7] .............................. C08G 64/00
(52) U.S. Cl. .................. 528/196; 422/131; 528/198
(58) Field of Search ................. 422/131; 528/196, 528/198

(56) References Cited

U.S. PATENT DOCUMENTS 6,294,352 B1   9/2001  Kimura ...................... 528/196

2001/0021765 A1   9/2001  Shimoda et al.
2003/0088051 A1 * 5/2003  Shimoda et al. ............ 528/196

FOREIGN PATENT DOCUMENTS

JP        07 242743 A      9/1995

\* cited by examiner

Primary Examiner—Terressa Boykin
(74) Attorney, Agent, or Firm—Norris McLaughlin & Marcus PA

(57) ABSTRACT

Polycarbonates are produced by reacting a monomeric carbonate component with at least one diphenol or dialcohol in the presence of a transesterification catalyst, wherein the molten component is mixed with the transesterification catalyst by stirring and a transesterification product is produced, which is polycondensated. For polycondensation, the transesterification product is passed through a preliminary reactor, at least one intermediate reactor and one final reactor, the reactors being connected in series and having a substantially horizontal driven shaft with stirrers attached thereto. It is ensured that in the preliminary reactor and in the final reactor a dwell time of the melt of 5 minutes to 2 hours is maintained, that the temperatures in the preliminary reactor are maintained in the range from 220 to 300° C. and in the final reactor in the range from 240 to 350° C., and that the pressure in the preliminary reactor is maintained in the range from 100 to 800 mbar and in the final reactor in the range from 0.1 to 50 mbar.

6 Claims, 1 Drawing Sheet

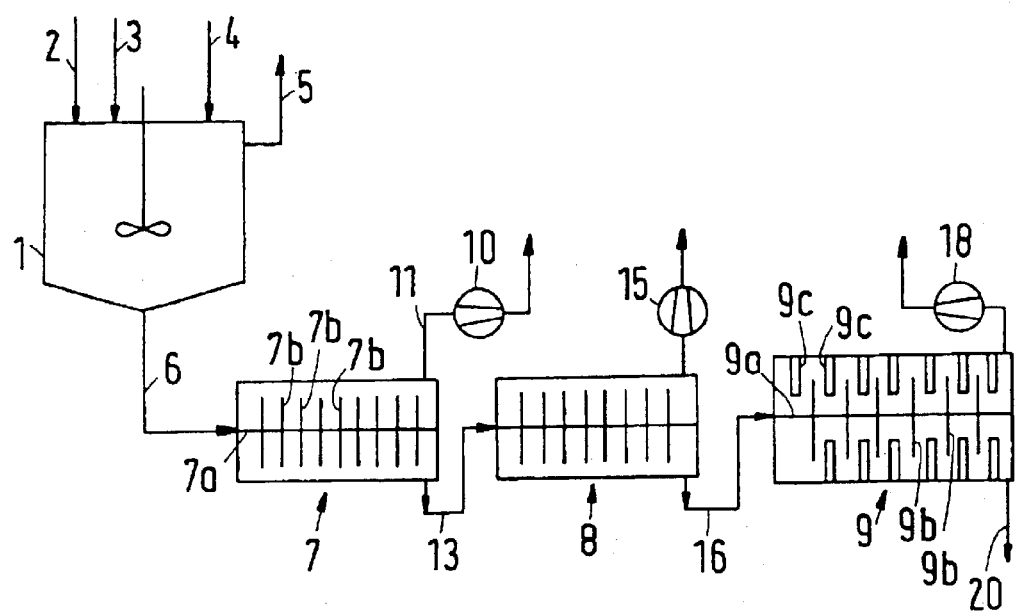

METHOD FOR PRODUCING POLYCARBONATES

This is a 371 of PCT/EP01/12930 filed 8 Nov. 2001 (international filing date).

BACKGROUND OF THE INVENTION

This invention relates to a process of producing polycarbonates by reacting a monomeric carbonate component with at least one diphenol or dialcohol in the presence of a transesterification catalyst, wherein the molten components are mixed with the transesterification catalyst by stirring and a transesterification product is produced, which is polycondensated.

In known processes for the continuous production of polycarbonates, up to 6 stirred tank reactors with vertical agitator shaft are used before the final reactor. As regards conversion and dwell time spectrum of the melt, these stirred tanks have considerable disadvantages over reactors through which the melt flows horizontally, for example. For the same conversion, a stirred tank requires a reaction volume which is 4 to 100 times as large, depending on the reaction rate, so that longer dwell times are obtained. As regards the dwell time spectrum of the melt, the stirred tank also has considerable disadvantages, because the concentration of the melt supplied is immediately diluted to the concentration in the stirred tank, which also is the outlet concentration. As compared to the reactor with horizontal plug flow and almost the same local dwell time of the reactants, this leads to a wider distribution of the dwell times. In the stirred tank, some particles quickly reach the reactor outlet together with the flow, while others dwell for a longer period together with the circulating flow, which is a reason for the width of the dwell time distribution. It should furthermore be considered that with very large reaction volumes the efficiency of the stirrer and the installations impeding the circulating flow likewise have a substantial influence on the dwell times of the melt in the reaction space. In the case of polymerization reactions, this behavior is detrimental, as long dwell times of a part of the reaction mass promote undesired side reactions and the distribution of the macromolecule chains is widened in an undesired way. It is known that the side reactions lead to more or less strong discolorations in the product.

It is the object underlying the invention to produce polycarbonates with a rather narrow distribution of the molecular weights and little side-chain branching. Furthermore, the product should rather not have any black particles, only a negligeably small amount of yellow coloring and only a low content of gel.

SUMMARY OF THE INVENTION

In accordance with the invention, this object is solved in that for polycondensation the transesterification product is passed through a preliminary reactor, at least one intermediate reactor and one final reactor, the reactors being connected in series and having a substantially horizontal driven shaft with stirrers attached thereto, and the polycarbonate from the final reactor maintaining a dwell time of the melt of 5 minutes to 2 hours and preferably 15 to 60 minutes, that the temperatures in the preliminary reactor are maintained in the range from 220 to 300° C. and in the final reactor in the range from 240 to 350° C., and that from each reactor vapors are withdrawn, the pressure in the preliminary reactor being maintained in the range from 100 to 800 mbar and in the final reactor in the range from 0.1 to 50 mbar. The number of series-connected intermediate reactors usually is about 1 to 3.

DETAILED DESCRIPTION

For the monomeric carbonate component, diphenyl carbonate or also linear or cyclic carbonates such as e.g. dimethyl carbonate, diethyl carbonate, ethylcene glycol carbonate, propylene glycol carbonate and butylene glycol carbonate can be used. For the diphenol or dialcohol component, there can be used for instance diphenol, which is known in the trade under the name "Bisphenol A". A suitable transesterification catalyst is described e.g. in GB patent 1,079,822. It contains alkali salts, tetraalkyl ammonium salts and tetraphenyl-borate.

Reactors which can be used as preliminary reactor, intermediate reactor or also final reactor are described e.g. in "Kunststoffe" 1/1992, pp. 17–20. For producing the vacuum in the reactors, there can be used e.g. mechanical devices or steam jet vacuum pumps as they are described in U.S. Pat. No. 5,576,414. It is usually ensured that the pressure in a directly succeeding reactor only is not more than half as high as in the directly preceding reactor.

For the desired plug flow in the reactors, the interior of each reactor should advantageously exhibit a ratio of the horizontal length L to the diameter D of 1.2:1 to 10:1 and preferably 1.5:1 to 5:1.

The use of 3, 4 or 5 reactors with horizontal driven shaft has the advantage that the temperature in the succeeding reactor can be raised with respect to the preceding reactor step by step, and the vacuum necessary for exhausting the breakdown reactors can also be adapted step by step. As a result, lower initial temperatures can be adjusted at the beginning of polycondensation with short chain lengths of the molecules and a still low polymer melting point. Moreover, at the beginning of polycondensation large amounts of breakdown products are obtained, and the same are advantageously withdrawn with only little vacuum, where it is also possible to employ less expensive pumps. In practice, steam or liquid injectors turned out to be particularly reliable for such exhaustion.

With increasing reaction time and reaction temperature, the polymer chains grow, and the viscosity of the melt increases. In adaptation thereto, the design of the various polycondensation reactors may be different. It is possible that the interior of individual reactors differs from the elongate cylindrical shape and e.g. has a conical shape.

Advantageously, the intermediate product to be supplied is introduced into one or more reactors through the bearing of the substantially horizontal shaft of the reactor. A separate sealing and bearing can thereby be omitted.

BRIEF DESCRIPTION OF THE DRAWINGS

Embodiments of the process will be explained with reference to the drawing, which FIG. 1 shows a flow diagram of the process.

The molten monomeric carbonate component is charged to a stirred tank (1) through line (2), and diphenol and/or dialcohol are supplied through line (3). The transesterification catalyst is supplied through line (4). At temperatures of 180 to 260° C., the components are mixed in the stirred tank (1), polycondensation being started. Vapors are withdrawn via line (5). The transesterification product continuously flowing in line (6) from the stirred tank (1) to a preliminary reactor (7) usually has molecules with average chain lengths of 1.1 to 8 structural units and preferably 1.5 to 4 structural units. The transesterification product is introduced into the preliminary reactor (7) through the bearing of the shaft (7a).

The preliminary reactor (7) has a horizontal agitator shaft (7a) with wheel-like stirrers (7b), as it is known from polycondensation reactors. In the preliminary reactor, a dwell time of the melt of 5 minutes to 2 hours and mostly 15 to 60 minutes is ensured; the temperatures usually lie in the range from 220 to 300° C. A blower (10) withdraws vapors from the preliminary reactor (7) through line (11) and ensures a pressure in the range from 100 to 800 mbar in the preliminary reactor (7). The vapors are supplied to a processing with condensation, which is not shown here.

The intermediate product leaving the preliminary reactor (7) via line (13) has molecules with average chain lengths of 10 to 25 structural units. This intermediate product is introduced into the intermediate reactor (8), which like the preliminary reactor (7) ensures dwell times in the range from 5 minutes to 2 hours and preferably 15 to 60 minutes. In the intermediate reactor, temperatures in the range from 230 to 320° C. are ensured and a pressure of 5 to 200 mbar, which is maintained by means of the exhauster (15).

The intermediate product leaving the intermediate reactor (8) via line (16) has molecules with an average chain length of 30 to 100 structural units; this molten intermediate product is supplied to the final reactor (9). Apart from the horizontal agitator shaft (9a) with wheel-like stirrers (9b), the final reactor preferably also includes stationary elements (9c). The temperatures in the final reactor (9) lie in the range from 240 to 350° C., and the pressure usually is 0.1 to 50 mbar. A blower (18) withdraws vapors from the final reactor (9).

The polycarbonate product is obtained in line (20), it is still pumpable and consists of molecules with average chain lengths in the range from 40 to 300 structural units and mostly at least 80 structural units. The vapors withdrawn by the blowers (15) and (18) can preferably be processed together with the vapors supplied by the blower (10), where valuable substances can be recovered in a manner known per se.

EXAMPLES

There is employed a pilot plant as it is represented in the drawing. In Example 4, a second preliminary reactor (77) is provided subsequent to the first preliminary reactor (7), and likewise in Example 5, where also a second intermediate reactor (88) is provided. The preliminary reactors are equipped with perforated discs; the intermediate reactors and the final reactors (9) are provided with ring discs, and the latter in addition with stationary elements (9c).

To the stirred tank (1) provided with jacket heating molten Bisphenol A is charged through line (2) and molten diphenyl carbonate is charged through line (3), furthermore a transesterification catalyst known per se, which substantially comprises alkali salts, tetraalkyl ammonium salts and tetraphenylborate.

Example 1

To the stirred tank (1), 45 kg/h Bisphenol A and 47 kg/h diphenyl carbonate is charged, as well as 25 kg/h catalyst. The reaction is effected at a temperature of 220° C. and a pressure of 800 mbar. Phenol released is withdrawn and collected and weighed to determine the reaction progress. The transesterified product from the stirred tank only has a low mean polymer chain length, which on average is about 3 structural units, and it still contains small amounts of unreacted monomer. This initial product flows into the preliminary reactor (7), which is operated at a pressure of 200 mbar.

Details of the procedure in the preliminary reactor (7), intermediate reactor (8) and final reactor (9) with respect to temperature T and pressure p can be taken from Table 1 below. A represents the amount of polycarbonate end product, which is withdrawn through line (20).

TABLE 1

|  | A | (7) T (° C.) p (mbar) | (77) T (° C.) p (mbar) | (8) T (° C.) p (mbar) | 88 T (° C.) p (mbar) | (9) T (° C.) P (mbar) |
|---|---|---|---|---|---|---|
| Example 1 | 50 kg/h | 270 200 | — | 285 15 | — | 310 1.8 |
| Example 2 | 75 kg/h | 270 200 | — | 285 15 | — | 310 1.8 |
| Example 3 | 100 kg/h | 270 200 | — | 285 15 | — | 310 1.8 |
| Example 4 | 50 kg/h | 275 250 | 280 100 | 300 15 | — | 320 0.5 |
| Example 5 | 50 kg/h | 275 250 | 280 100 | 285 25 | 305 10 | 320 0.5 |
| Example 6 | 75 kg/h | 280 150 | — | 300 15 | — | 320 0.5 |

Table 1 furthermore provides the data for Examples 2 to 6 explained below.

In Example 1, the preliminary reactor (7) has a volume of 50 liters and a ratio of the length L to the diameter D of L/D=2.3; in the intermediate reactor (8) the ratio L/D=2.2 with a volume of 48 liters, and the final reactor (9) has a volume of 45 liters and a ratio L/D=2.5.

For Example 1 and also for the other Examples, the following Table 2 indicates dwell times t and mean chain lengths K of the polycondensate at the outlet of the respective reactor, where for K the number of structural units are indicated.

TABLE 2

|  | (7) t (min) | (7) K | (77) t (min) | (77) K | (8) t (min) | (8) K | (88) t (min) | (88) K | (9) t (min) | (9) K |
|---|---|---|---|---|---|---|---|---|---|---|
| Example 1 | 30 | 17 | — | — | 30 | 43 | — | — | 30 | 78 |
| Example 2 | 20 | 15 | — | — | 20 | 35 | — | — | 20 | 54 |
| Example 3 | 10 | 13 | — | — | 10 | 30 | — | — | 10 | 48 |
| Example 4 | 20 | 12 | 20 | 37 | 30 | 60 | — | — | 30 | 132 |
| Example 5 | 20 | 12 | 20 | 37 | 30 | 48 | 30 | 65 | 30 | 152 |
| Example 6 | 20 | 20 | — | — | 20 | 51 | — | — | 20 | 107 |

In accordance with Example 1, the intermediate product flows from the preliminary reactor (7) to the intermediate reactor (8), and due to the increasing chain length of the molecules in the intermediate reactor, slightly different stirring members are used than in the preliminary reactor. In the intermediate reactor, there is ensured a spacing of 3 mm between the stirring members and the inner wall. From the intermediate reactor, the product with a mean chain length of 43 structural units is delivered to the final reactor (9) by means of a gear pump. The product leaving the final reactor only has little yellow coloring caused by breakdown products, the product contains very small amounts of gels and black particles and has a narrow molecular-weight distribution and a minimum of chain branching, as can be taken from Table 3 below.

Example 2

The procedure of Example 1 is employed, a dwell time of 20 minutes being adjusted in each reactor.

Example 3

The procedure of Example 1 is employed and a dwell time of 10 minutes is ensured in each reactor.

Example 4

Two preliminary reactors (7) and (77) are employed, which each have a ratio L/D=1.5.

Example 5

Example 4 is modified to the effect that beside the two preliminary reactors there is also used a first intermediate reactor (8) and a second intermediate reactor (88).

Example 6

The procedure of Example 1 is employed, and there is now used a single final reactor (9) with an L/D ratio of 3.

The quality of the respective end product produced can be taken from Table 3 below:

TABLE 3

|  | b | L | P | G | SP | V |
|---|---|---|---|---|---|---|
| Example 1 | 1.93 | 97.2 | 2.33 | 0.22 | 2.30 | 1.00 |
| Example 2 | 1.73 | 98.1 | 2.29 | 0.21 | 1.88 | 0.50 |
| Example 3 | 1.64 | 98.3 | 2.11 | 0.19 | 1.56 | 0.10 |
| Example 4 | 1.68 | 98.0 | 2.50 | 0.21 | 1.78 | 1.20 |
| Example 5 | 1.72 | 97.9 | 2.59 | 0.24 | 1.80 | 1.05 |
| Example 6 | 1.80 | 97.5 | 2.28 | 0.19 | 2.10 | 0.95 | wherein:

b ist the so-called b-value which indicates the yellow-blue tinge.

L is the light transmission index; it indicates the degree of transparency, measured in %, based on the standard value. The values b and L are measured with the Gardner calorimeter.

P is the polydispersity, measured with a membrane osmometer in consideration of the measured scattering of light. The membrane osmometer (firm Knauer, Berlin, Germany) provides the number average of the molecular weight, the scattering of light provides the weight average of the molecules. The ratio of weight average to number average is P.

G is the gel content in mg/1000 kg; it is measured as follows:

1 kg polycarbonate end product are dissolved in 10 kg methylene chloride. The solution is passed through a microfilter with a pore size of 1 $\mu$m. The filter residue is weighed; it is composed of the gels and the black particles. The content of black particles is determined optically; their number per 100 kg polycarbonate is indicated in column SP.

We claim:

1. A process for producing polycarbonates by reacting a monomeric carbonate component with at least one diphenol or dialcohol in the presence of a transesterification catalyst, wherein the molten components are mixed with the transesterification catalyst by stirring and a transesterification product is produced, which is polycondensated, wherein for polycondensation the transesterification product is passed through a preliminary reactor, at least one intermediate reactor and one final reactor, said reactors being connected in series and each having a substantially horizontal driven shaft with stirrers attached thereto, the polycarbonate being withdrawn from the final reactor, each reactor having in its interior a ratio of the horizontal length L to the diameter D of 1.2:1 to 10:1 the preliminary reactor and the final reactor each having a dwell time of the melt of 5 minutes to 30 minutes, the temperature in the preliminary reactor being maintained in the range from 220 to 300° C. and the temperature in the final reactor being maintained in the range from 240 to 350° C., with vapors being withdrawn from each reactor, the pressure in the preliminary reactor being maintained in the range from 100 to 900 mbar and the pressure in the final reactor being maintained in the range from 0.1 to 50 mbar.

2. The process as claimed in claim 1, wherein the pressure in a directly succeeding reactor is not more than half as high as it is in the directly preceding reactor.

3. The process as claimed in claim 1 wherein a transesterification product whose molecules have average chain lengths of 1.1 to 8 structural units is supplied to the preliminary reactor.

4. The process as claimed in claim 1 wherein the melt withdrawn from the preliminary reactor has average chain lengths of the molecules of 10 to 25 structural units.

5. The process as claimed in claim 1 wherein a melt with an average chain length of the molecules of 30 to 100 structural units is supplied to the final reactor.

6. The process as claimed in claim 1 wherein intermediate product is supplied to at least one of the reactors through the bearing of its substantially horizontal shaft.

* * * * *

UNITED STATES PATENT AND TRADEMARK OFFICE
CERTIFICATE OF CORRECTION

PATENT NO. : 6,838,543 B2
APPLICATION NO. : 10/433252
DATED : January 4, 2005
INVENTOR(S) : Kaempf et al.

It is certified that error appears in the above-identified patent and that said Letters Patent is hereby corrected as shown below:

Column 2, Lines 51-53, "Embodiments of the process will be explained with reference to the drawing, which FIG. 1 shows a flow diagram of the process." should read
-- Figure 1 shows a flow diagram of the process. --

Column 5, Line 48, "b ist the" should read -- b is the --

Column 6, Lines 14-15, "a monomeric carbonate" should read -- a molten monomeric carbonate --

Column 6, Line 28, "10:1 the preliminary" should read -- 10:1, the preliminary --

Signed and Sealed this

Eighteenth Day of March, 2008

JON W. DUDAS
*Director of the United States Patent and Trademark Office*